(12) United States Patent
Zhang et al.

(10) Patent No.: US 11,868,485 B2
(45) Date of Patent: Jan. 9, 2024

(54) OPERATION METHOD, OPERATION APPARATUS, AND DEVICE

(71) Applicant: HUAWEI TECHNOLOGIES CO., LTD., Shenzhen (CN)

(72) Inventors: Qinglong Zhang, Hangzhou (CN); Qianying Tang, Shenzhen (CN); Wangchen Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 17/568,967

(22) Filed: Jan. 5, 2022

(65) Prior Publication Data
US 2022/0129565 A1 Apr. 28, 2022

Related U.S. Application Data

(63) Continuation of application No. PCT/CN2020/100658, filed on Jul. 7, 2020.

(30) Foreign Application Priority Data

Jul. 9, 2019 (CN) .......................... 201910613478.4

(51) Int. Cl.
G06F 21/60 (2013.01)
H04L 9/30 (2006.01)

(52) U.S. Cl.
CPC .............. *G06F 21/60* (2013.01); *H04L 9/302* (2013.01); *H04L 9/3066* (2013.01)

(58) Field of Classification Search
CPC ........ G06F 21/60; H04L 9/302; H04L 9/3066
See application file for complete search history.

(56) References Cited

U.S. PATENT DOCUMENTS

2007/0177721 A1* 8/2007 Itoh .......................... G06F 7/723
380/28
2008/0240443 A1* 10/2008 Vuillaume ............ H04L 9/3247
380/277

(Continued)

FOREIGN PATENT DOCUMENTS

CN 101131719 A 2/2008
CN 201181472 Y 1/2009

(Continued)

OTHER PUBLICATIONS

Chevallier-Mames et al., "Low-Cost Solutions for Preventing Simple Side-Channel Analysis: Side-Channel Atomicity", IEEE Transactions on Computers, vol. 53, No. 6, Jun. 2004, 9 pages.

*Primary Examiner* — Saleh Najjar
*Assistant Examiner* — Devin E Almeida
(74) *Attorney, Agent, or Firm* — Maier & Maier, PLLC

(57) ABSTRACT

A storage circuit stores secret information. A software processing circuit obtains an operation task and generates scheduling instructions corresponding to the operation task. After receiving the scheduling instructions, a hardware processing circuit obtains the secret information from the storage circuit when the flag bit in the scheduling instruction is a valid value, determines, based on the secret information, data addresses of one or more pieces of operation data required for completing the operation corresponding to the scheduling instruction, and obtains the one or more pieces of operation data based on the data addresses to complete the operation corresponding to each scheduling instruction.

15 Claims, 11 Drawing Sheets

(56) References Cited

U.S. PATENT DOCUMENTS

| | | | |
|---|---|---|---|
| 2009/0138948 A1* | 5/2009 | Calamera | H04L 9/3234 |
| | | | 380/259 |
| 2009/0238360 A1 | 9/2009 | Ciet et al. | |
| 2011/0091037 A1* | 4/2011 | Pinder | H04L 9/0897 |
| | | | 380/255 |
| 2012/0137137 A1* | 5/2012 | Brickell | G06F 21/73 |
| | | | 713/182 |
| 2012/0321075 A1 | 12/2012 | Joye et al. | |
| 2022/0138349 A1* | 5/2022 | Saarinen | G06F 9/30029 |
| | | | 713/192 |

FOREIGN PATENT DOCUMENTS

| | | |
|---|---|---|
| CN | 101504599 A | 8/2009 |
| CN | 102221987 A | 10/2011 |
| CN | 103229451 A | 7/2013 |
| CN | 104916302 A | 9/2015 |
| CN | 109067523 A | 12/2018 |

* cited by examiner

| Operation type | Flag bit | Loop quantity | Operation constant | Target address | Source Address 2 | Source Address 1 |
|---|---|---|---|---|---|---|
| Modular multiplication operation | 1 | i | N | Preset fill-in value | Address of T[2] | Preset fill-in value |

FIG. 4A

| Operation type | Flag bit | Loop quantity | Operation constant | Target address | Source Address 2 | Source Address 1 |
|---|---|---|---|---|---|---|
| Modular multiplication operation | 0 | i | N | Address of T[2] | Address of T[2] | Address of T[2] |

FIG. 4B

| Operation type | Flag bit | Loop quantity | Modulus | Target address | Source Address 2 | Source Address 1 |
|---|---|---|---|---|---|---|
| MM | 1 | 0 | 8 | Address of T[0] | Address of T[2] | Address of T[0] |

FIG. 8A

| Operation type | Flag bit | Loop quantity | Modulus | Target address | Source Address 2 | Source Address 1 |
|---|---|---|---|---|---|---|
| MM | 1 | 0 | 8 | Address of T[1] | Address of T[2] | Address of T[1] |

FIG. 8B

OPERATION METHOD, OPERATION APPARATUS, AND DEVICE

CROSS-REFERENCE TO RELATED APPLICATIONS

This application is a continuation of International Application No. PCT/CN2020/100658, filed on Jul. 7, 2020, which claims priority to Chinese Patent Application No. 201910613478.4, filed on Jul. 9, 2019. The disclosures of the aforementioned applications are hereby incorporated by reference in their entireties.

FIELD

The embodiments relate to the field of computer technologies, and in particular, to an operation method, an operation apparatus, and a device.

BACKGROUND

In the field of information security technologies, many data processing (such as digital signature and data encryption) processes need to reply on secret information, and the secret information is information that affects data security.

In the conventional technology, in a data processing process, to improve an operation speed, data processing is usually coordinately performed by a software processing circuit and a hardware processing circuit. The data processing usually includes a plurality of types of operations, such as a point multiplication operation, a point addition operation, a point doubling operation, and a modular addition operation. During the data processing, the software processing circuit usually generates, based on secret information, a scheduling instruction corresponding to each operation, and the hardware processing circuit executes the scheduling instruction to complete the corresponding operation. However, when a software processing circuit is attacked by software, the secret information is leaked, and consequently operation security is relatively low.

SUMMARY

An operation method, an operation apparatus, and a device improve operation security.

According to a first aspect, an embodiment provides an operation method that is applied to an operation system. The operation system includes a software processing circuit, a hardware processing circuit, and a storage circuit. The software processing circuit is configured to work by executing a software program. The storage circuit stores secret information. The software processing circuit obtains an operation task, and generates, based on the operation task, one or more scheduling instructions corresponding to the operation task, where the operation task includes performing one or more operations, and each scheduling instruction includes an operation type of one operation and a flag bit; and the software processing circuit sends the one or more scheduling instructions to the hardware processing circuit, and the hardware processing circuit obtains the secret information from the storage circuit when the flag bit in the scheduling instruction is a valid value, determines, based on the secret information, data addresses of one or more pieces of operation data required for completing the operation corresponding to the scheduling instruction, and obtains the one or more pieces of operation data based on the data addresses to complete the operation corresponding to each scheduling instruction, to complete the operation task.

In the foregoing process, after the software processing circuit obtains the operation task, the software processing circuit generates the one or more scheduling instructions based on the operation task, and a process in which the software processing circuit generates the scheduling instruction does not rely on the secret information. The hardware processing circuit may execute the corresponding operation based on the scheduling instruction and the secret information. Because the process in which the software processing circuit generates the scheduling instruction does not rely on the secret information, the software processing circuit is prevented from obtaining the secret information, so that secret information leakage caused when the software processing circuit is attacked by software can be prevented, thereby improving operation security.

In a possible implementation, the data addresses of the one or more pieces of operation data required for completing the operation corresponding to the scheduling instruction may be determined based on the secret information in the following feasible implementation: obtaining preset first relationships, where the first relationships are operation relationships between registers configured to store the one or more pieces of operation data and the secret information; determining the registers based on the first relationships and the secret information; and determining addresses of the registers as the data addresses.

In the foregoing process, because the first relationships are operation relationships between the registers configured to store the one or more pieces of operation data and the secret information, in a process in which the hardware processing circuit performs the operation, the registers can be determined based on the operation relationships and the secret information, and then the data addresses of the one or more pieces of operation data required for completing the operation corresponding to the scheduling instruction can be determined based on the addresses of the registers.

In a possible implementation, the one or more pieces of operation data include a first source operand and a target operand, and the data addresses that are of the one or more pieces of operation data required for completing the operation corresponding to the scheduling instruction and that are determined based on the secret information include a data address of the first source operand and a data address of the target operand.

In a possible implementation, the operation task is a point multiplication operation task or a modular exponentiation operation task; and the scheduling instruction further includes a loop quantity i, where i is a quantity of times that the operation is currently performed in the operation task, i is an integer from 0 to N−1, and N is a binary length of the secret information; and correspondingly, the first relationships are relationships between identifiers of the registers and a value of an $i^{th}$ bit in the secret information.

In the foregoing process, when the operation task is the point multiplication operation task or the modular exponentiation operation task, an operation included in the operation task is a loop operation, and the loop quantity i is set in the scheduling instruction, so that the quantity of times that the operation is currently performed can be determined by using the loop quantity i in the scheduling instruction.

In a possible implementation, that the software processing circuit generates, based on the operation task, one or more scheduling instructions corresponding to the operation task includes: when determining that a data address related to the secret information exists in data addresses of one or more pieces of operation data required for an operation, the software processing circuit sets a flag bit in a scheduling instruction corresponding to the operation to the valid value; or when determining that no data address related to the secret information exists in data addresses of one or more pieces of operation data required for an operation, the software processing circuit sets a flag bit in a scheduling instruction corresponding to the operation to an invalid value.

In the foregoing process, in the process in which the software processing circuit generates the scheduling instruction, the flag bit is set in the scheduling instruction, and a value of the flag bit in the scheduling instruction is set to the valid value or the invalid value based on an actual operation status. In this way, after the hardware processing circuit receives the scheduling instruction, the hardware processing circuit can determine, based on the value of the flag bit in the scheduling instruction, whether the data addresses of the one or more pieces of operation data required for completing the operation corresponding to the scheduling instruction need to be determined based on the secret information, so that the hardware processing circuit can perform a correct operation.

In a possible implementation, the operation type is a modular multiplication operation or a modular addition operation.

In a possible implementation, the secret information is a private key in an RSA algorithm; or the secret information is a random number in elliptic curve cryptography.

According to a second aspect, an embodiment provides an operation apparatus, including a software processing circuit, a hardware processing circuit, and a storage circuit. The software processing circuit is configured to work by executing a software program. The storage circuit stores secret information.

The software processing circuit is configured to obtain an operation task, where the operation task includes performing one or more operations.

The software processing circuit is configured to generate, based on the operation task, one or more scheduling instructions corresponding to the operation task, where each scheduling instruction includes an operation type of one operation and a flag bit.

The hardware processing circuit is configured to: after receiving the one or more scheduling instructions, obtain the secret information from the storage circuit when the flag bit in the scheduling instruction is a valid value, determine, based on the secret information, data addresses of one or more pieces of operation data required for completing the operation corresponding to the scheduling instruction, and obtain the one or more pieces of operation data based on the data addresses to complete the operation corresponding to each scheduling instruction, to complete the operation task.

In a possible implementation, the hardware processing circuit is configured to:
  obtain preset first relationships, where the first relationships are operation relationships between registers configured to store the one or more pieces of operation data and the secret information;
  determine the registers based on the first relationships and the secret information; and
  determine addresses of the registers as the data addresses.

In a possible implementation, the one or more pieces of operation data include a first source operand and a target operand, and the data addresses that are of the one or more pieces of operation data required for completing the operation corresponding to the scheduling instruction and that are determined based on the secret information include a data address of the first source operand and a data address of the target operand.

In a possible implementation, the operation task is a point multiplication operation task or a modular exponentiation operation task; and the scheduling instruction further includes a loop quantity i, where i is a quantity of times that the operation is currently performed in the operation task, i is an integer from 0 to N−1, and N is a binary length of the secret information; and
  correspondingly, the first relationships are relationships between identifiers of the registers and a value of an $i^{th}$ bit in the secret information.

In a possible implementation, the software processing circuit is configured to:
  when determining that a data address related to the secret information exists in data addresses of one or more pieces of operation data required for an operation, set a flag bit in a scheduling instruction corresponding to the operation to the valid value; or
  when determining that no data address related to the secret information exists in data addresses of one or more pieces of operation data required for an operation, set a flag bit in a scheduling instruction corresponding to the operation to an invalid value.

In a possible implementation, the operation type is a modular multiplication operation or a modular addition operation.

In a possible implementation, the secret information is a private key in an RSA algorithm; or
  the secret information is a random number in elliptic curve cryptography.

According to a third aspect, a storage medium is configured to store a computer program, and the computer program is used to implement the operation method according to any implementation of the first aspect.

According to a fourth aspect, an embodiment further provides a chip or an integrated circuit, including: a storage medium and a processor.

The storage medium is configured to store program instructions, and sometimes, is further configured to store intermediate data.

The processor is configured to invoke the program instructions stored in the storage medium, to implement the operation method described in any implementation of the first aspect.

According to a fifth aspect, an embodiment further provides a program product. The program product includes a computer program. The computer program is stored in a storage medium, and the computer program is used to implement the operation method described in any implementation of the first aspect.

The embodiments provide the operation method, the operation apparatus, and the device. The operation system may include the software processing circuit and the hardware processing circuit. After obtaining the operation task, the software processing circuit generates the one or more scheduling instructions based on the operation task, and the process in which the software processing circuit generates the scheduling instruction does not rely on the secret information. The hardware processing circuit may execute the corresponding operation based on the scheduling instruction and the secret information. Because the process in which the software processing circuit generates the scheduling instruction does not rely on the secret information, the software processing circuit is prevented from obtaining the secret information, so that secret information leakage caused when the software processing circuit is attacked by software can be prevented, thereby improving operation security.

BRIEF DESCRIPTION OF DRAWINGS

FIG. 4A is a schematic diagram of a scheduling instruction according to an embodiment;

FIG. 4B is a schematic diagram of another scheduling instruction according to an embodiment;

FIG. 8A is a schematic diagram of another scheduling instruction according to an embodiment;

FIG. 8B is a schematic diagram of another scheduling instruction according to an embodiment.

DETAILED DESCRIPTION OF THE EMBODIMENTS

To facilitate understanding of embodiments, related nouns in the embodiments are first explained.

Public key algorithm: The public key algorithm uses asymmetric encryption. Data encryption/decryption, data signature/signature verification, and the like may be implemented by using the public key algorithm. A pair of keys usually needs to be used in the public key algorithm, and data encryption/decryption, data signature/signature verification, and the like can be implemented only by using a pair of keys. Common public key algorithms include an RSA (Rivest-Shamir-Adleman) algorithm, elliptic curve cryptography (ECC), SM2 elliptic curve public key cryptography, an ElGamal algorithm, a backpack algorithm, and the like.

Key pair: A password pair includes a private key and a public key. The private key is secret information, the private key is usually held by a key pair owner, and the private key needs to be kept secret. The public key is public information, and the public key is usually published by the key pair holder to another person, and the public key does not need to be kept secret.

Public key digital signature/signature verification: During digital signature of a message, the message is digitally signed by using a private key. During verification of a digital signature, the digital signature is verified by using a private key.

Public key algorithm operation: The public key algorithm operation is an operation in a public key algorithm. For example, the operation may include at least one of a modular multiplication operation, a modular addition operation, a modular exponentiation operation, a point addition operation, a point multiplication operation, or a point doubling operation. A private key may need to be used in a process of performing the operation.

Figure 1:
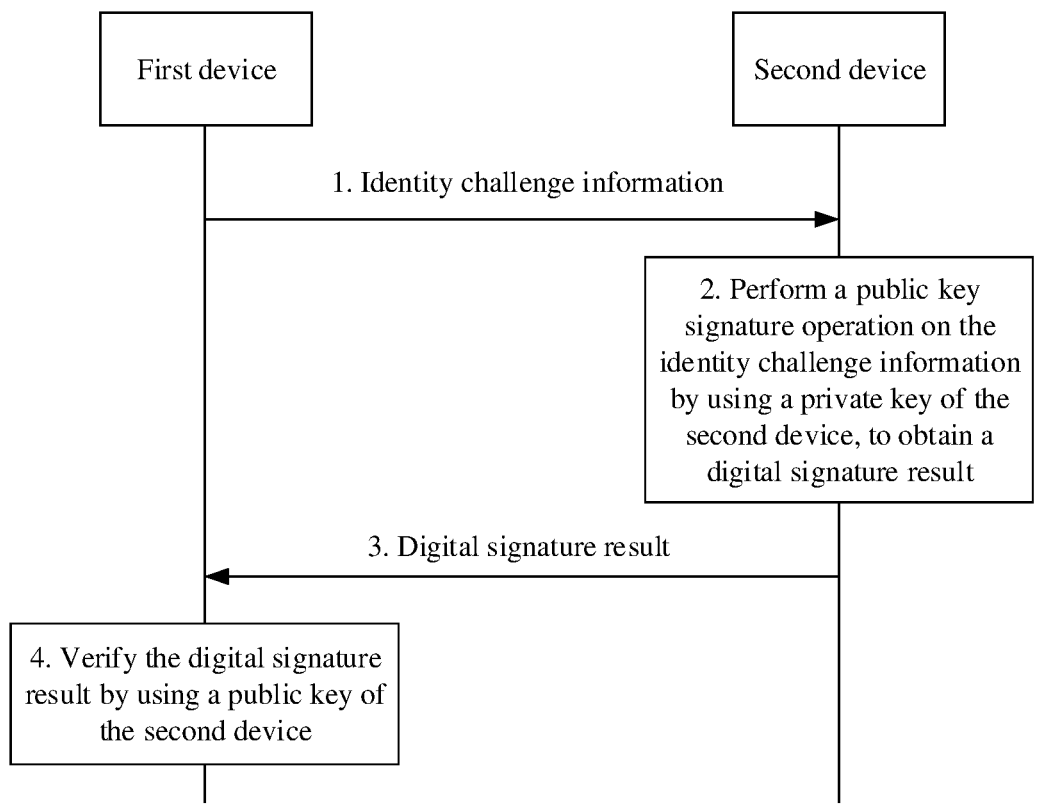
FIG. 1 is a schematic diagram of an operation method according to an embodiment.

FIG. 1 is a schematic diagram of an operation method according to an embodiment. A first device and a second device are included, and the first device and the second device each may be a terminal device, a network device, or the like. For example, the first device may be a server-side device, and the second device may be a terminal device.

When the first device needs to authenticate an identity of the second device, the first device may send identity challenge information to the second device. The identity challenge information is used to request to verify the identity of the second device. After receiving the identity challenge information, the second device performs a public key signature operation on the identity challenge information by using a private key of the second device, to obtain a digital signature result, and sends the digital signature result to the first device. The first device verifies the digital signature result by using a public key of the second device. The public key signature operation performed by the second device on the identity challenge information by using the private key of the second device improves security of the private key of the second device.

It should be noted that FIG. 1 shows only one possible scenario. The embodiments may be applied to another scenario. This is not limited in the embodiments.

Figure 2:
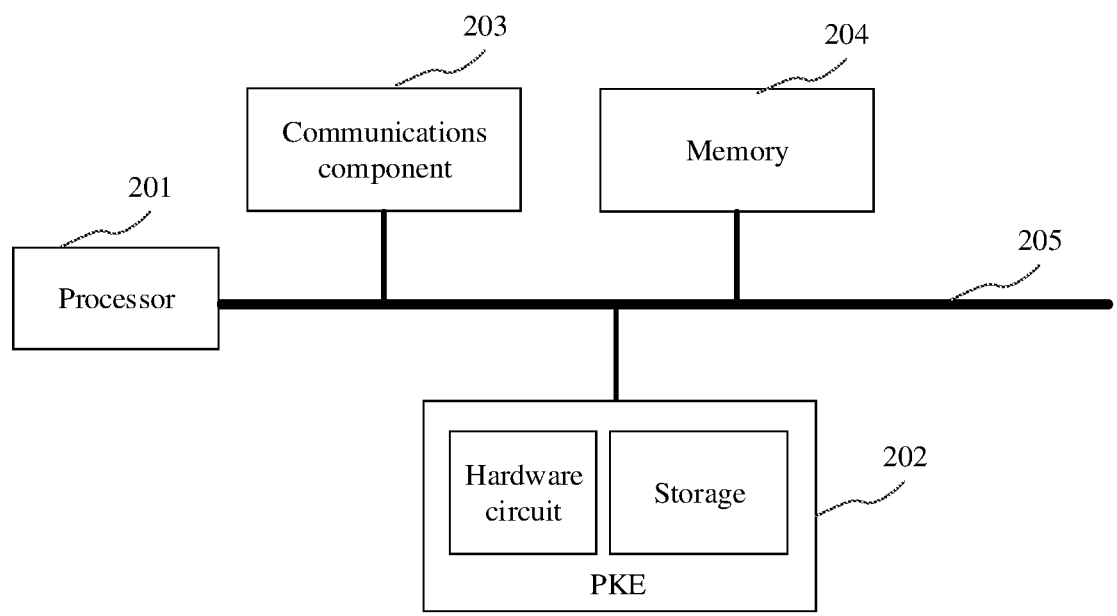
FIG. 2 is a diagram of an architecture of an operation system according to an embodiment.

FIG. 2 is a diagram of an architecture of an operation system according to an embodiment. The operation system may be deployed in any electronic device. For example, the operation system may be deployed in the second device shown in the embodiment in FIG. 1. The operation system includes a processor 201, a public key engine (PKE) 202, a communications component 203, a memory 204, a bus 205, and the like. The PKE 202 is mounted on the bus 205 in a form of an intellectual property (IP) core.

The PKE 202 may include a hardware circuit, a storage medium, and the like. The hardware circuit may include a logical determining circuit, a logical operation circuit, or the like. The storage medium may include a register, a RAM, or the like. An operand for an operation can be stored in the register. The communications component 203 may include a transmitter and/or a receiver. The operation system may communicate with another device by using the communications component 203, for example, receive information from another device, and/or send information to another device. The memory 204 may store a public key algorithm and a related driver that drives execution of the public key algorithm. For example, the memory 204 may be a flash memory. The processor 201 can execute the public key algorithm in the memory 204.

In an actual process, in a process of performing a public key algorithm operation, the processor 201 may generate a scheduling instruction based on the public key algorithm stored in the memory 204, and the hardware circuit in the PKE 202 performs an operation on an operand in the storage medium (for example, a register) based on the scheduling instruction.

In this embodiment, the operation system may include a software processing circuit and a hardware processing circuit. For example, a processing process of the software processing circuit relies on the processor 201 that supports an instruction set, for example, an x86 processor or an ARM processor, that is, a function of the software processing circuit is implemented by using the processor 201. The hardware processing circuit may include the components shown in the PKE 202 in the embodiment in FIG. 2. The hardware processing circuit may be implemented based on an integrated circuit (such as an ASIC or an FPGA) or a discrete element. In practice, to achieve better performance, the hardware processing circuit is usually implemented by using an integrated circuit.

In the process of performing the public key algorithm operation, the software processing circuit generates a scheduling instruction, and a process in which the software processing circuit generates the scheduling instruction does not rely on secret information (for example, a private key). The hardware processing circuit performs an operation on an operand in a corresponding register based on the scheduling instruction. In the foregoing process, because the process in which the software processing circuit generates the scheduling instruction does not rely on the secret information, the software processing circuit is prevented from obtaining the secret information, so that secret information leakage caused when the software processing circuit is attacked by software can be prevented, thereby improving operation security.

The following describes the solutions in detail with reference to embodiments. It should be noted that the following embodiments may be independent or may be combined with each other, and same or similar content is not described repeatedly in different embodiments.

Figure 3:
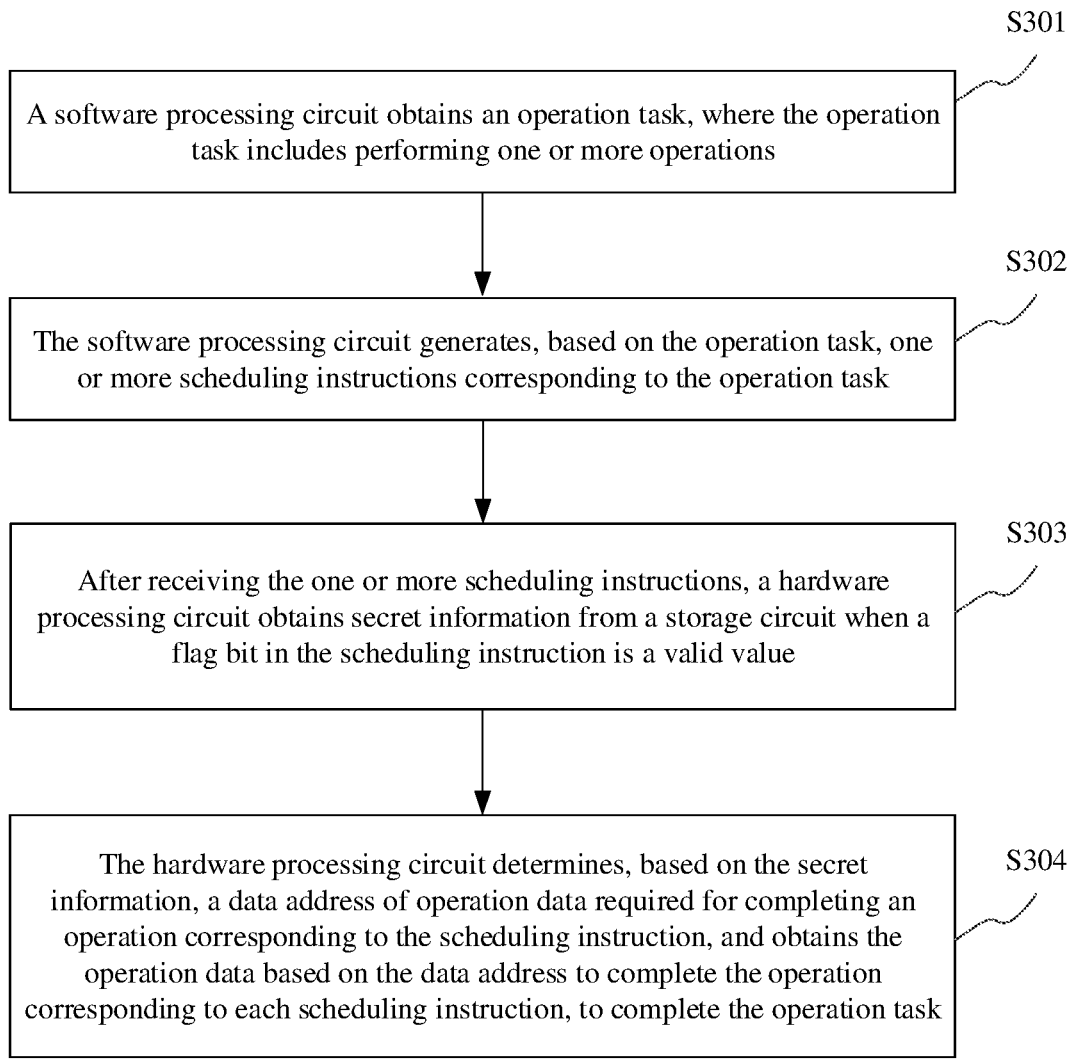
FIG. 3 is a schematic flowchart of an operation method according to an embodiment.

FIG. 3 is a schematic flowchart of an operation method according to an embodiment. The method may be applied to an operation system. The operation system includes a software processing circuit, a hardware processing circuit, and a storage circuit. The storage circuit stores secret information. The method may include the following steps.

S301. The software processing circuit obtains an operation task, where the operation task includes performing one or more operations.

Optionally, the operation task may be a point multiplication operation task, a modular exponentiation operation task, or the like. The operation included in the operation task may be a modular multiplication operation and/or a modular addition operation.

In a process in which the operation system performs data processing, when the operation system performs a step that relates to the operation task, the software processing circuit in the operation system can obtain the operation task.

The following example describes a manner in which the software processing circuit obtains the operation task.

For example, an RSA signature process may include the following steps:

Step 1: Encode a to-be-signed message. For example, the encoding may be public key cryptography standards (PKCS) 1_v1_5 encoding.

Step 2: Perform a modular exponentiation operation on encoded data M to obtain a data signature result, where the modular exponentiation operation is $M^d$, and d is a private key.

A pseudocode corresponding to step 2 may be shown as follows:

In an actual process, when the operation system performs step 2, the software processing circuit in the operation system may obtain a modular exponentiation operation task. The modular exponentiation operation task includes the modular multiplication operation T[~ki]=T[~ki]*T[2] mod N and the modular multiplication operation T[2]=T[2]*T[2] mod N. The modular multiplication operation T[~ki]=T[~ki]*T[2] mod N is performed in the following process: performing the modular multiplication operation based on values in a register T[~ki] and the register T[2] and storing an operation result in the register T[~ki]. The modular multiplication operation T[2]=T[2]*T[2] mod N is performed in the following process: performing the modular multiplication operation based on a value in the register T[2] and storing an operation result in the register T[2].

S302. The software processing circuit generates, based on the operation task, one or more scheduling instructions corresponding to the operation task.

One operation in the operation task corresponds to one or more instructions.

If an operation is a loop operation, the operation corresponds to a plurality of scheduling instructions. For example, refer to the pseudocode shown in S301. For the operation T[~ki]=T[~ki]*T[2] mod N, the operation is a loop operation, and a value of i is successively 0 to N−1. When the value of i is 0, the operation corresponds to one scheduling instruction. When the value of i is 1, the operation corresponds to one scheduling instruction. By analogy, the operation T[~ki]=T[~ki]*T[2] mod N corresponds to N scheduling instructions.

If an operation is not a loop operation, the operation corresponds to one scheduling instruction.

Each scheduling instruction includes an operation type of one operation and a flag bit.

Optionally, the operation type included in the scheduling instruction may be a modular multiplication operation, a modular addition operation, or the like.

Optionally, the flag bit may be a valid value, or may be an invalid value. For example, the valid value may be 1, and the invalid value may be 0. Alternatively, the valid value may be 0, and the invalid value may be 1. Certainly, the valid value and the invalid value may be other values. This is not limited in this embodiment.

When determining that a data address related to the secret information exists in data addresses of one or more pieces of operation data required for an operation, the software processing circuit sets a flag bit in a scheduling instruction corresponding to the operation to the valid value. Optionally, Initialize:

T[0] = r mod N; //T[0] represents a register T[0], r is a random number, and N is a binary length of the secret information T[1] = r − 1 mod N; //T[1] represents a register T[1]

T[2] = M mod N; //T[2] represents a register T[2]

Loop:

For i = 0 ... N − 1 begin

T[~ki] = T[~ki] * T[2] mod N; //ki is an $i^{th}$ bit in the binary secret information, a value of ki is 0 or 1, and ~ki is a negation of ki T[2] = T[2] * T[2] mod N;

End

Return: T[0] * r − 1 mod N data addresses of one or more of pieces of operation data required for an operation may be related to the secret information.

When determining that no data address related to the secret information exists in data addresses of one or more pieces of operation data required for an operation, the software processing circuit sets a flag bit in a scheduling instruction corresponding to the operation to the invalid value.

The secret information shown in this embodiment is information that needs to be kept secret and that needs to be used when the operation in the operation task is performed. For example, the secret information may be a private key in an RSA algorithm, or the secret information may be a random number in elliptic curve cryptography.

For example, refer to the pseudocode shown in S301. For the operation $T[\sim ki]=T[\sim ki]*T[2]$ mod N, because the register $T[\sim ki]$ in the operation needs to be related to the secret information, a flag bit in a scheduling instruction that corresponds to the operation and that is generated by the software processing circuit is the valid value, and the software processing circuit may further determine, based on the operation, that an operation type is modular multiplication. For the operation $T[2]=T[2]*T[2]$ mod N, because the register $T[2]$ in the operation is unrelated to the secret information, a flag bit in a scheduling instruction that corresponds to the operation and that is generated by the software processing circuit is the invalid value, and the software processing circuit may further determine, based on the operation, that an operation type is modular multiplication.

Optionally, the scheduling instruction usually further includes three address fields, and values in the three address fields respectively represent an address of a target register (a target address), an address of a first source register (a first source address), and an address of a second source register (a second source address). Data in the first source register is a first source operand, and data in the second source register is a second source operand. In the operation, an operation result is determined based on the data in the first source register and the second source register, and the operation result is stored in the target register. For example, if the operation is $T[\sim ki]=T[\sim ki]*T[2]$ mod N, the target register is $T[\sim ki]$, the first source register is $T[\sim ki]$, and the second source register is $T[2]$. In this case, the operation $T[\sim ki]*T[2]$ mod N is performed based on data in the first source register ($T[\sim ki]$) and the second source register ($T[2]$), to obtain an operation result, and the operation result is written into the target register $T[\sim ki]$.

Optionally, when the operation task is a point multiplication operation task or a modular exponentiation operation task, a scheduling instruction generated based on an operation in the operation task may further include a loop quantity i, where i is a quantity of times that the operation is currently performed in the operation task, i is an integer from 0 to N−1, and N is a binary length of the secret information. For example, refer to the pseudocode in S301. The operation $T[\sim ki]=T[\sim ki]*T[2]$ mod N in the operation task is a loop operation, and therefore the generated scheduling instruction corresponding to the operation further includes a loop quantity i.

Optionally, when an operation relates to a constant operand, the scheduling instruction may further include the constant operand. For example, refer to the pseudocode in S301. For the operation $T[\sim ki]=T[\sim ki]*T[2]$ mod N, the operation includes the constant operand N, and therefore the scheduling instruction may include the constant operand N.

The following describes several possible scheduling instructions with reference to FIG. 4A and FIG. 4B.

For example, refer to the pseudocode in S301. For the operation $T[\sim ki]=T[\sim ki]*T[2]$ mod N, the generated scheduling instruction corresponding to the operation may be shown in FIG. 4A. FIG. 4A is a schematic diagram of a scheduling instruction according to an embodiment. The scheduling instruction includes the following fields: an operation type, a flag bit, a loop quantity, an operation constant, a target address, a source address 2, and a source address 1. A value of the operation type field is an identifier of a modular multiplication operation, a value of the flag bit field is 1, a value of the loop quantity field is i (a value of i is 0 to N−1), a value of the operation constant field is N, a value of the target address field is a preset fill-in value, a value of the source address 2 field is an address of a register T[2], and a value of the source address 1 field is the preset fill-in value.

For example, refer to the pseudocode in S301. For the operation $T[2]=T[2]*T[2]$ mod N, the generated scheduling instruction corresponding to the operation may be shown in FIG. 4B. FIG. 4B is a schematic diagram of another scheduling instruction according to an embodiment. The scheduling instruction includes the following fields: an operation type, a flag bit, a loop quantity, an operation constant, a target address, a source address 2, and a source address 1. A value of the operation type field is an identifier of a modular multiplication operation, a value of the flag bit field is 0, a value of the loop quantity field is i (a value of i is 0 to N−1), a value of the operation constant field is N, a value of the target address field is an address of a register T[2], a value of the source address 2 field is the address of the register T[2], and a value of the source address 1 field is the address of the register T[2].

S303. After receiving the one or more scheduling instructions, the hardware processing circuit obtains the secret information from a storage circuit when the flag bit in the scheduling instruction is the valid value.

After the software processing circuit generates the scheduling instruction, the software processing circuit sends the scheduling instruction to the hardware processing circuit. The software processing circuit may generate the scheduling instructions in a specific order based on the actual operations in the operation task and send the generated scheduling instructions to the hardware processing circuit. Correspondingly, the hardware processing circuit also executes the scheduling instructions in the sequence of the scheduling instructions.

For example, refer to the pseudocode in S301. The software processing circuit may first generate a scheduling instruction corresponding to $T[\sim ki]=T[\sim ki]*T[2]$ mod N when i=0, and then generate a scheduling instruction corresponding to $T[2]=T[2]*T[2]$ mod N when i=0. Then, the software processing circuit may generate a scheduling instruction corresponding to $T[\sim ki]=T[\sim ki]*T[2]$ mod N when i=1, and then generate a scheduling instruction corresponding to $T[2]=T[2]*T[2]$ mod N when i=1. By analogy, the process does not end until a scheduling instruction corresponding to $T[2]=T[2]*T[2]$ mod N when i=N−1 is generated. The software processing circuit sends the scheduling instructions to the hardware processing circuit in the generation sequence of the scheduling instructions. Correspondingly, the hardware processing circuit executes the scheduling instruction in a sequence in which the scheduling instructions are received.

S304. The hardware processing circuit determines, based on the secret information, data addresses of one or more pieces of operation data required for completing the operation corresponding to the scheduling instruction, and obtains the one or more pieces of operation data based on the data addresses to complete the operation corresponding to each scheduling instruction, to complete the operation task.

Optionally, the hardware processing circuit may determine, in the following feasible implementation, the data addresses of the one or more pieces of operation data required for completing the operation corresponding to the scheduling instruction: obtaining preset first relationships, where the first relationships are operation relationships between registers configured to store the one or more pieces of operation data and the secret information; determining the registers based on the first relationships and the secret information; and determining addresses of the registers as the data addresses.

Optionally, the first relationships may be operation relationships between identifiers of the registers and the secret information. Correspondingly, the identifiers of the registers may be determined based on the first relationship and the secret information, and the addresses of the registers corresponding to the identifiers of the registers may be determined as the data addresses.

Optionally, when the scheduling instruction includes a loop quantity i, the first relationship may be identifier of a register=~ki, where ki is a value of an $i^{th}$ bit in the binary secret information, a value of ki is 0 or 1, and ~ki is a negation of ki, that is, ~ki is 0 when ki is 1, or ~ki is 1 when ki is 0.

For example, assuming that a binary private key is 01100100, and the first relationship is identifier of a register=~ki, when i=0, it may be determined that the identifier of the register is ~k0=1; or when i=1, it may be determined that the identifier of the register is ~k1=0.

It should be noted that the foregoing illustrates the first relationship only in an example form and constitutes no limitation on the first relationship. In an actual process, the first relationship may be set based on an actual requirement. This is not limited in this embodiment.

This embodiment provides the operation method. The operation system may include the software processing circuit and the hardware processing circuit. After obtaining the operation task, the software processing circuit generates the one or more scheduling instructions based on the operation task, and a process in which the software processing circuit generates the scheduling instruction does not rely on the secret information. The hardware processing circuit may execute the corresponding operation based on the scheduling instruction and the secret information. Because the process in which the software processing circuit generates the scheduling instruction does not rely on the secret information, the software processing circuit is prevented from obtaining the secret information, so that secret information leakage caused when the software processing circuit is attacked by software can be prevented, thereby improving operation security.

Figure 5:
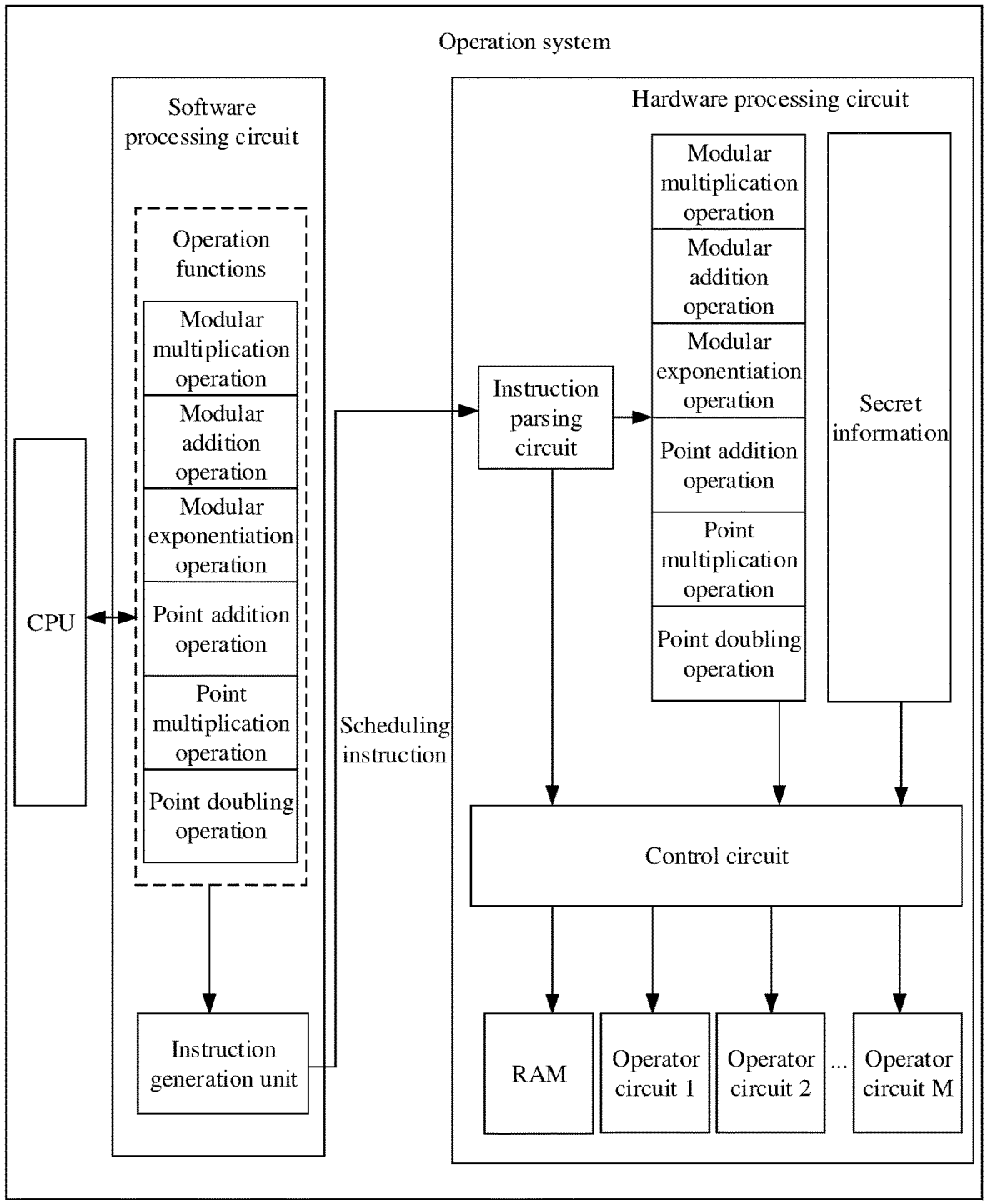
FIG. 5 is a schematic diagram of an operation system according to an embodiment.

Based on any one of the foregoing embodiments, the following describes in detail the operation method shown with reference to FIG. 5.

FIG. 5 is a schematic diagram of an operation system according to an embodiment. The operation system includes a software processing circuit and a hardware processing circuit.

An execution process of the software processing circuit relies on a central processing unit (CPU). The software processing circuit includes operation functions of a plurality of operations and an instruction generation unit. After obtaining an operation task, the software processing circuit may generate a scheduling instruction based on the operation task and the operation functions. A process in which the software processing circuit generates the scheduling instruction does not need to rely on secret information. If values of some fields (addresses of registers) in the scheduling instruction are related to the secret information, the values of the fields each are filled with a preset fill-in value, and a value of a flag bit is set to a valid value, to indicate that the scheduling instruction has no complete true information, and the complete true information needs to be determined by the hardware processing circuit with reference to the secret information. The software processing circuit may further set a loop quantity, an operation constant, or the like in the scheduling instruction. After generating the scheduling instruction, the software processing circuit sends the scheduling instruction to the hardware processing circuit.

The hardware processing circuit includes an instruction parsing circuit and may parse the received scheduling instruction by using the instruction parsing circuit. When it is learned, after the parsing, that the value of the flag bit is the valid value, which indicates that values of some fields in the scheduling instruction are not true, true values of the fields need to be obtained based on the secret information. For example, when a control circuit determines that the instruction parsing circuit learns, after the parsing, that the value of the flag bit is the valid value, the control circuit may further obtain an operation type (for example, a modular multiplication operation or a modular addition operation) obtained after the parsing; obtain a method that corresponds to the operation type and that is used to obtain the true values of the fields based on the secret information; obtain the true values of the fields based on the method, to determine the complete true information in the scheduling instruction; and schedule an underlying operator module and a RAM based on the complete true information in the scheduling instruction, to complete an operation corresponding to the scheduling instruction. Each underlying operator circuit may be alternatively implemented by using a hardware circuit, and the RAM is configured to store an intermediate value.

Figure 6:
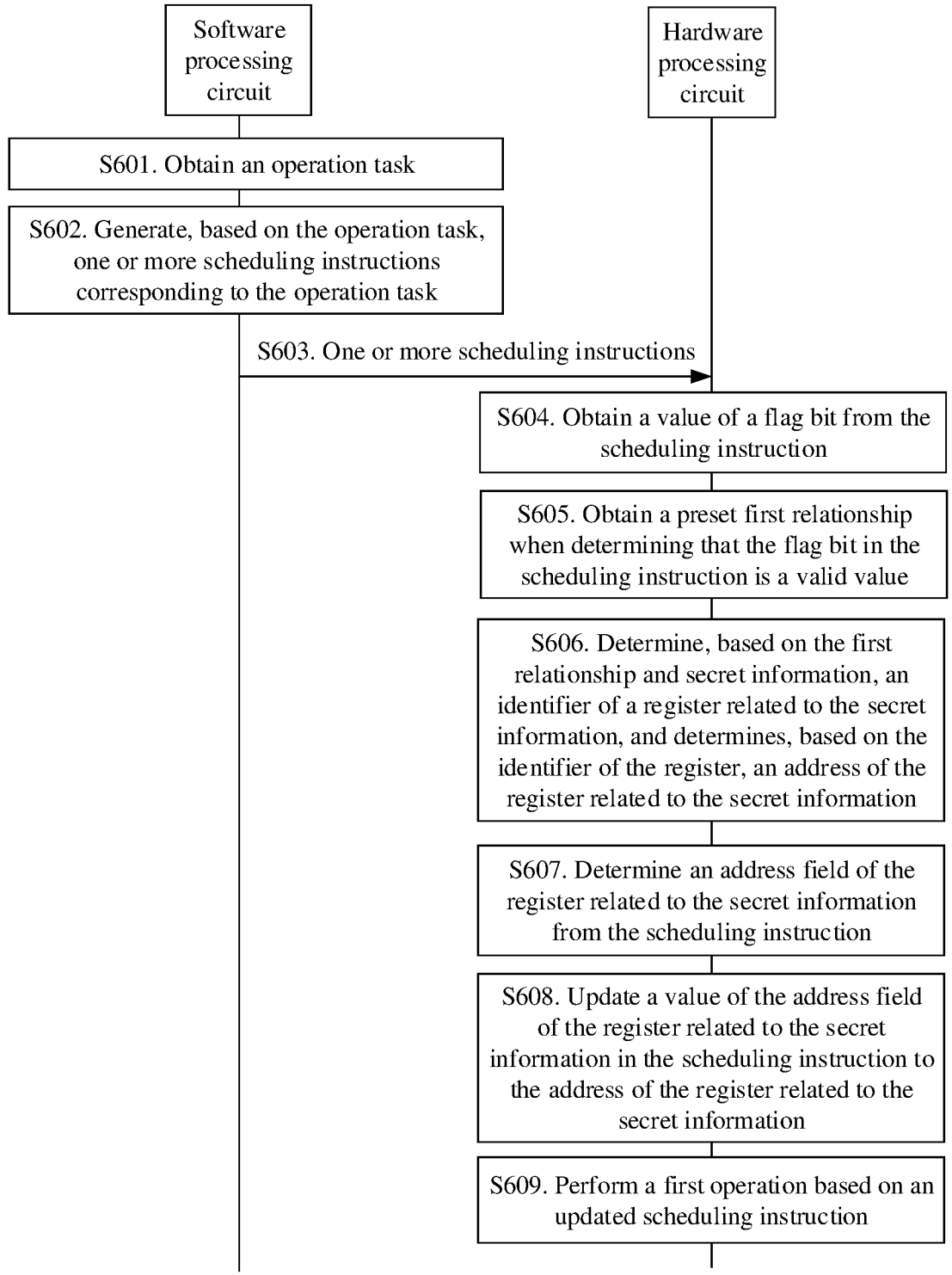
FIG. 6 is a schematic flowchart of another operation method according to an embodiment.

FIG. 6 is a schematic flowchart of another operation method according to an embodiment. The method may include the following steps.

S601. A software processing circuit obtains an operation task.

The operation task includes performing one or more operations.

It should be noted that, for a process of performing S601, refer to a process of performing S301. Details are not described herein again.

S602. The software processing circuit generates, based on the operation task, one or more scheduling instructions corresponding to the operation task.

Optionally, each scheduling instruction may include an operation type of one operation, a flag bit, a target address, a first source address, and a second source address. When the operation is a loop operation, the scheduling instruction further includes a loop quantity i. When the operation relates to a constant operand, the scheduling instruction further includes the constant operand.

It should be noted that, for a process of performing S602, refer to a process of performing S302. Details are not described herein again.

S603. The software processing circuit sends the one or more scheduling instructions to a hardware processing circuit.

The hardware processing circuit processes the received scheduling instructions in a same process. The following provides descriptions by using, as an example, a process in which the hardware processing circuit processes any received scheduling instruction.

S604. The hardware processing circuit obtains a value of a flag bit from the scheduling instruction.

Optionally, if the flag bit is a valid value, the following S605 to S609 are further performed.

Optionally, if the flag bit is an invalid value, an operation is directly performed based on the scheduling instruction.

S605. The hardware processing circuit obtains a preset first relationship when determining that the flag bit in the scheduling instruction is the valid value.

The first relationship is an operation relationship between a register and secret information. For example, an identifier of the register may be obtained through calculation based on the secret information and the first relationship.

Optionally, an algorithm (software code) corresponding to the operation task may be obtained, and the first relationship may be obtained based on the algorithm corresponding to the operation task.

For example, assuming that an operation is $T[\sim ki]=T[\sim ki]*T[2] \bmod N$, it may be determined that the first relationship is identifier of a register=$\sim ki$.

Optionally, a correspondence between an operation type and the first relationship may be preset in the hardware processing circuit. Correspondingly, the first relationship may be obtained based on the operation type and the correspondence.

Optionally, when the scheduling instruction includes the loop quantity i, the first relationship is a relationship between the identifier of the register and a value of an $i^{th}$ bit in the secret information.

It should be noted that, for related descriptions of the first relationship, refer to S303. The details are not described herein again.

S606. The hardware processing circuit determines, based on the first relationship and the secret information, the identifier of the register related to the secret information, and determines, based on the identifier of the register, an address of the register related to the secret information.

The register related to the secret information is a register whose data address is related to the secret information.

Optionally, the identifier of the register may be a number of the register. For example, an identifier of a register T[0] is 0, an identifier of a register [1] is 1, and an identifier of a register [2] is 2.

Optionally, the address of the register is an actual physical address of the register.

A correspondence between the identifier of the register and the address of the register may be preset, and the address of the register may be determined based on the identifier of the register and the correspondence.

S607. The hardware processing circuit determines an address field of the register related to the secret information from the scheduling instruction.

Optionally, the algorithm (software code) corresponding to the operation task may be obtained, and the address field of the register may be determined based on the algorithm corresponding to the operation task.

For example, assuming that a pseudocode of an operation is $T[\sim ki]=T[\sim ki]*T[2] \bmod N$, it may be determined that address fields of registers related to secret information are a target address field and a first source address field.

S608. The hardware processing circuit updates a value of the address field of the register related to the secret information in the scheduling instruction to the address of the register related to the secret information.

The address of the register related to the secret information in the scheduling instruction received by the hardware processing circuit is a preset fill-in value, and the preset fill-in value is not a true address of the register. Therefore, after the value of the address field of the register related to the secret information is updated, an address of each register in an updated scheduling instruction can be a true address.

S609. The hardware processing circuit performs a first operation based on the updated scheduling instruction.

In the embodiment shown in FIG. 6, the software processing circuit generates the scheduling instructions based on the operation task, and a process in which the software processing circuit generates the scheduling instruction does not rely on the secret information. The hardware processing circuit may execute the corresponding operation based on the scheduling instruction and the secret information. Because the process in which the software processing circuit generates the scheduling instruction does not rely on the secret information, the software processing circuit is prevented from obtaining the secret information, so that secret information leakage caused when the software processing circuit is attacked by software can be prevented, thereby improving operation security.

The following describes, by using a specific example, in detail the operation method shown in the foregoing embodiment.

Example 1: An RSA Signature Process is Used as an Example for Description

The RSA signature process may include the following steps: Step 1: Encode a to-be-signed message. Step 2: Perform a modular exponentiation operation on encoded data M to obtain a data signature result, where the modular exponentiation operation is $M^d$, and d is a private key.

A pseudocode corresponding to step 2 may be shown as follows:

```
Initialize:
   T[0] = r mod N; //T[0] represents a register T[0], r is a random number, and N is a binary
length of the private key
   T[1] = r − 1 mod N; //T[1] represents a register T[1]
   T[2] = M mod N; //T[2] represents a register T[2]
Loop:
   For i = 0 ... N − 1 begin
   T[~ki] = T[~ki] * T[2] mod N; //ki is an i^th bit in the binary secret information, a value of
ki is 0 or 1, and ~ki is a negation of ki
   T[2] = T[2] * T[2] mod N;
   End
   Return: T[0] * r − 1 mod N
```

N loops may be included. In each loop, the software processing circuit generates a scheduling instruction corresponding to T[~ki]=T[~ki]*T[2] mod N and a scheduling instruction corresponding to T[2]=T[2]*T[2] mod N, and correspondingly, the hardware processing circuit executes the scheduling instruction corresponding to T[~ki]=T[~ki]*T[2] mod N and the scheduling instruction corresponding to the T[2]=T[2]*T[2] mod N. That is, in a process of performing step 2, the software processing circuit generates 2N scheduling instructions, including N scheduling instructions corresponding to T[~ki]=T[~ki]*T[2] mod N and N scheduling instructions corresponding to T[2]=T[2]*T[2] mod N, and correspondingly, the hardware processing circuit executes the 2N scheduling instructions.

Figure 7:
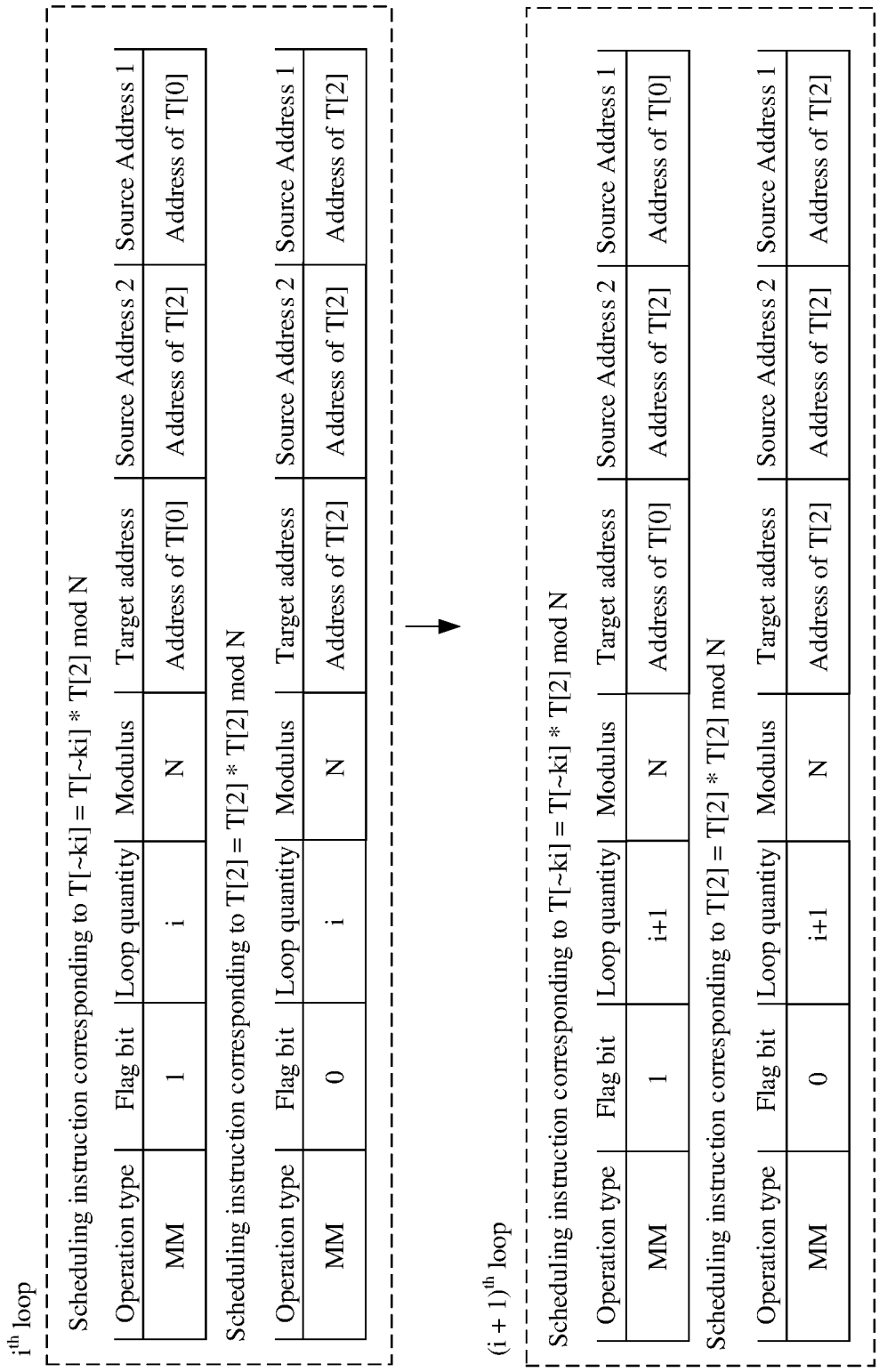
FIG. 7 is a schematic generation diagram of a scheduling instruction according to an embodiment.

With reference to FIG. 7, the following describes a process of generating the scheduling instruction.

FIG. 7 is a schematic generation diagram of a scheduling instruction according to an embodiment. For any $i^{th}$ loop, the software processing circuit first generates a scheduling instruction corresponding to T[~ki]=T[~ki]*T[2] mod N, and the hardware processing circuit executes the scheduling instruction. After the hardware processing circuit executes the scheduling instruction, the software processing circuit generates a scheduling instruction corresponding to T[2]=T[2]*T[2] mod N, and the hardware processing circuit executes the scheduling instruction. After the $i^{th}$ loop is executed, an $(i+1)^{th}$ loop is executed. By analogy, the process does not end until the N loops are executed.

In the scheduling instruction corresponding to T[~ki]=T[~ki]*T[2] mod N, MM is an identifier of a modular multiplication operation, a value 1 of a flag bit is used to indicate that addresses of some registers need to be determined based on the secret information, and a value (an address of T[0]) of each of a target address field and a source address 1 field is a preset fill-in value. In the scheduling instruction corresponding to T[2]=T[2]*T[2] mod N, a value 0 of a flag bit is used to indicate that addresses of some registers do not need to be determined based on the secret information, and values of a target address field, a source address 1 field, and a source address 2 field each are a true address of a register.

It should be noted that the software processing circuit generates, in similar processes, all the scheduling instructions corresponding to T[~ki]=T[~ki]*T[2] mod N, and the hardware processing circuit executes, in similar processes, all the scheduling instructions corresponding to T[~ki]=T[~ki]*T[2] mod N. The following describes a process in which the software processing circuit generates one scheduling instruction corresponding to T[~ki]=T[~ki]*T[2] mod N and a process in which the hardware processing circuit executes one scheduling instruction corresponding to T[~ki]=T[~ki]*T[2] mod N.

Assuming that the binary secret information is 01001011, and a process in which the software processing circuit generates, for the first time, a scheduling instruction corresponding to T[~ki]=T[~ki]*T[2] mod N is as follows:

The software processing circuit determines that an operation type in the operation task is a modular multiplication operation and sets a value of an operation type field to an identifier (MM) of the modular multiplication operation. The software processing circuit determines that a data address related to the secret information exists in data addresses of one or more pieces of operation data required for the operation, and therefore sets a value of a flag bit field to 1. Because this operation is the first operation, a value of a loop quantity field is set to a current loop quantity 0. Because a modulus is a binary length of the secret information, and the binary length of the secret information is 8, a value of a modulus field is set to 8. Because the target register T[~ki] is related to the secret information, a value of a target address field may be filled with a preset fill-in value. Assuming that the preset fill-in value is an address of a register T[0], the value of the target address field is set to the address of the register T[0]. Because the source register 2 (T[2]) is unrelated to the secret information, a value of a source address 2 field may be set to an address of the register T[2]. Because the source register 1 (T[~ki]) is related to the secret information, and the preset fill-in value is the address of the register T[0], a value of a source address 1 field may be set to the address of the register T[0].

After the foregoing processing, the software processing circuit may generate the scheduling instruction. The scheduling instruction may be shown in FIG. 8A. FIG. 8A is a schematic diagram of another scheduling instruction according to an embodiment. The scheduling instruction includes an operation type field, a flag bit field, a loop quantity field, a modulus field, a target address field, a source address 2 field, and a source address 1 field. A value of each field is shown in FIG. 8A, and details are not described herein.

After the software processing circuit generates the scheduling instruction, the software processing circuit sends the scheduling instruction to the hardware processing circuit.

After receiving the scheduling instruction, the hardware processing circuit first parses the scheduling instruction. The hardware processing circuit determines that the value of the flag bit field in the scheduling instruction is 1, and therefore determines that a register related to the secret information exists. Because T[~ki]=T[~ki]*T[2] mod N that an address field of a register of a first type in the scheduling instruction is the target address field and the source address 1 field. Because T[~ki]=T[~ki]*T[2] mod N that identifier of the register related to the secret information=~ki, where ki is an $i^{th}$ bit in the binary private key. In this case, the hardware processing circuit obtains the current loop quantity 0 from the scheduling instruction and obtains a value (0) of a $0^{th}$ bit from the secret information (01001011), and therefore the identifier of the register related to the secret information is 1. Therefore, it may be determined that the values of the target address field and the source address 1 field in the scheduling instruction are both an address of a register T[1], and the values of the target address field and the source address 1 field may be modified. A modified scheduling instruction is shown in FIG. 8B.

FIG. 8B is a schematic diagram of another scheduling instruction according to an embodiment. A value of a target address field is an address of a register T[1], and a value of a source address 1 field is the address of the register T[1].

After determining the scheduling instruction shown in FIG. 8B, the hardware processing circuit may perform a modular multiplication operation based on values of the target address field, the source address 1 field, and a source address 2 field in the scheduling instruction shown in FIG. 8B.

Example 2: An Elliptic Signature Process is Used as an Example for Description

The elliptic signature process may include the following steps:

Step 1: Select a random number k, where a value range of k is [1, n−1], n is an order of an elliptic curve, and k is secret information.

Step 2: Calculate k*P=(x1, y1), where P is a base point of the elliptic curve.

Step 3: Calculate r=x1 mod n; and determine whether r is 0; and if yes, perform step 1; or if no, perform step 4.

Step 4: Calculate e=H(m), where m is a to-be-signed message, and H0 is a hash function.

Step 5: Calculate s=k−1 (e+d*r) mod n, where d is a signature private key of the elliptic curve; determine whether s is 0; and if yes, perform step 1; or if no, perform step 6.

Step 6: Return (r, s).

For step 2 of the elliptic signature, the secret information k needs to be used in a process of performing the point multiplication operation k*P=(x1, y1). A pseudocode corresponding to the point multiplication operation may be shown as follows:

Initialize:

T[0] = R; //R is a random point on the elliptic curve

T[1] = −R; //−R is an inverse element point of R on the elliptic curve

T[2] = C; //C is a point on the elliptic curve.

Loop:

For i = 0 ... N − 1 begin

T[~ki] = T[~ki] + T[2] //point addition operation, where ki is an i$^{th}$ bit in the binary secret information, a value of ki is 0 or 1, and ~ki is a negation of ki T[2] = 2 * T[2] //point doubling operation End Return: T[0] + (−R)

N loops may be included. In each loop, the software processing circuit generates a scheduling instruction corresponding to T[~ki]=T[~ki]+T[2] and a scheduling instruction corresponding to T[2]=2*T[2], and correspondingly, the hardware processing circuit executes the scheduling instruction corresponding to T[~ki]=T[~ki]+T[2] and the scheduling instruction corresponding to the T[2]=2*T[2]. That is, in a process of performing step 2, the software processing circuit generates 2N scheduling instructions, including N scheduling instructions corresponding to T[~ki]=T[~ki]+T[2] and N scheduling instructions corresponding to T[2]=2*T[2], and correspondingly, the hardware processing circuit executes the 2N scheduling instructions.

It should be noted that the software processing circuit generates, in similar processes, all the scheduling instructions corresponding to T[~ki]=T[~ki]+T[2], and the hardware processing circuit executes, in similar processes, all the scheduling instructions corresponding to T[~ki]=T[~ki]+T[2]. The following describes a process in which the software processing circuit generates one scheduling instruction corresponding to T[~ki]=T[~ki]+T[2] and a process in which the hardware processing circuit executes one scheduling instruction corresponding to T[~ki]=T[~ki]+T[2].

The point addition operation needs to be implemented by using a plurality of scheduling instructions. The following illustrates the plurality of scheduling instructions with reference to Table 1. A Jacobian coordinate system is used as an example. Assuming that two input points are P (X1, Y1, Z1) and Q (X2, Y2, Z2), and an output point addition result P+Q=(X3, Y3, Z3), the point addition operation needs to be implemented by using the plurality of scheduling instructions shown in Table 1.

TABLE 1

| Step | Operation instruction | Whether the step relies on the secret information (1: Yes, and 0: No) |
|---|---|---|
| 1 | L1 = Z2 * Z2 | 0 |
| 2 | L2 = Z1 * Z1 | 1 |
| 3 | A1 = X1 * L1 | 1 |
| 4 | A2 = X2 * L2 | 0 |
| 5 | L3 = Y1 * Z2 | 1 |
| 6 | A3 = A1 − A2 | 0 |
| 7 | A7 = A1 + A2 | 0 |
| 8 | L4 = Z1 * Y2 | 1 |
| 9 | A4 = L1 * L3 | 0 |

TABLE 1-continued

| Step | Operation instruction | Whether the step relies on the secret information (1: Yes, and 0: No) |
|---|---|---|
| 10 | L8 = A7 + A7 | 0 |
| 11 | A5 = L2 * L4 | 0 |
| 12 | L6 = A3 * A3 | 0 |
| 13 | A6 = A4 − A5 | 0 |
| 14 | A8 = A4 + A5 | 0 |
| 15 | L9 = L6 * L8 | 0 |
| 16 | L7 = A6 * A6 | 0 |
| 17 | L11 = L9/2 | 0 |
| 18 | L12 = L11 + L9 | 0 |
| 19 | L10 = A3 * L6 | 0 |
| 20 | L13 = L7 + L7 | 0 |
| 21 | L14 = A8 * L10 | 0 |
| 22 | L15 = L12 − L13 | 0 |
| 23 | L16 = L15 * A6 | 0 |
| 24 | X3 = L7 − L11 | 1 |
| 25 | L5 = Z1 * Z2 | 1 |
| 26 | Y3 = L16 − L14 | 1 |
| 27 | Y3 = Y3/2 | 1 |
| 28 | Z3 = A3*L5 | 1 |

As shown in Table 1, the point addition operation may include 28 instructions. Because the first operand P of the point addition relies on the secret information, during generation of the scheduling instructions, if addresses of X1, Y1, and Z1 are used, flag bits are all 1 (1 indicates that a register of a first type is used). A flag bit of a scheduling instruction corresponding to the calculation result (X3, Y3, Z3) of the point addition is also 1.

After the software processing circuit generates the scheduling instruction, the software processing circuit sends the scheduling instruction to the hardware processing circuit.

After receiving the scheduling instruction, the hardware processing circuit performs a corresponding operation based on the scheduling instruction. A process of performing the corresponding operation is similar to the process of performing the corresponding operation in Example 1, and details are not described herein again.

Figure 9:
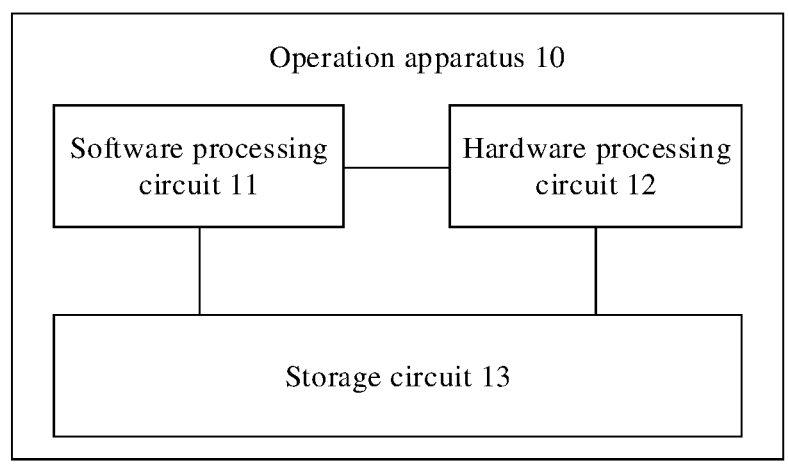
FIG. 9 is a schematic diagram of a structure of an operation apparatus according to an embodiment.

FIG. 9 is a schematic diagram of a structure of an operation apparatus according to an embodiment. An operation apparatus 10 may include a software processing circuit 11, a hardware processing circuit 12, and a storage circuit 13. The software processing circuit 11 is configured to work by executing a software program. The storage circuit 13 stores secret information.

The software processing circuit 11 is configured to obtain an operation task, where the operation task includes performing one or more operations.

The software processing circuit 11 is configured to generate, based on the operation task, one or more scheduling instructions corresponding to the operation task, where each scheduling instruction includes an operation type of one operation and a flag bit.

The hardware processing circuit 12 is configured to: after receiving the one or more scheduling instructions, obtain the secret information from the storage circuit 13 when the flag bit in the scheduling instruction is a valid value, determine, based on the secret information, data addresses of one or more pieces of operation data required for completing the operation corresponding to the scheduling instruction, and obtain the one or more pieces of operation data based on the data addresses to complete the operation corresponding to each scheduling instruction, to complete the operation task.

Optionally, the software program may be stored in the storage circuit 13, and the software processing circuit 11 may read the software program from the storage circuit 13.

Optionally, the software processing circuit 11 may perform S301 and S302 in the embodiment in FIG. 3 and S601 to S603 in the embodiment in FIG. 6.

Optionally, the hardware processing circuit 12 may perform S303 and S304 in the embodiment in FIG. 3 and S604 to S609 in the embodiment in FIG. 6.

It should be noted that the operation apparatus shown in the embodiments may perform the solutions shown in the foregoing method embodiments. Implementation principles and beneficial effects of the operation apparatus are similar to those of the solutions, and details are not described herein again.

In a possible implementation, the hardware processing circuit 12 is configured to:
  obtain preset first relationships, where the first relationships are operation relationships between registers configured to store the one or more pieces of operation data and the secret information;
  determine the registers based on the first relationships and the secret information; and
  determine addresses of the registers as the data addresses.

In a possible implementation, the one or more pieces of operation data include a first source operand and a target operand, and the data addresses that are of the one or more pieces of operation data required for completing the operation corresponding to the scheduling instruction and that are determined based on the secret information include a data address of the first source operand and a data address of the target operand.

In a possible implementation, the operation task is a point multiplication operation task or a modular exponentiation operation task; and the scheduling instruction further includes a loop quantity i, where i is a quantity of times that the operation is currently performed in the operation task, i is an integer from 0 to N−1, and N is a binary length of the secret information; and correspondingly, the first relationships are relationships between identifiers of the registers and a value of an $i^{th}$ bit in the secret information.

In a possible implementation, the software processing circuit 11 is configured to:
  when determining that a data address related to the secret information exists in data addresses of one or more pieces of operation data required for an operation, set a flag bit in a scheduling instruction corresponding to the operation to the valid value; or
  when determining that no data address related to the secret information exists in data addresses of one or more pieces of operation data required for an operation, set a flag bit in a scheduling instruction corresponding to the operation to an invalid value.

In a possible implementation, the operation type is a modular multiplication operation or a modular addition operation.

In a possible implementation, the secret information is a private key in an RSA algorithm; or
  the secret information is a random number in elliptic curve cryptography.

It should be noted that the operation apparatus shown in the embodiments may perform the solutions shown in the foregoing method embodiments. Implementation principles and beneficial effects of the operation apparatus are similar to those of the solutions, and details are not described herein again.

A storage medium is configured to store a computer program, and the computer program is used to implement the operation method in the foregoing embodiments.

An embodiment further provides a chip or an integrated circuit, including a storage medium and a processor.

The storage medium is configured to store program instructions, and sometimes, is further configured to store intermediate data.

The processor is configured to invoke the program instructions stored in the storage medium, to implement the operation method described in the foregoing.

Optionally, the storage medium may be independent or integrated with the processor. In some implementations, the storage medium may be further located outside of the chip or the integrated circuit.

An embodiment further provides a program product. The program product includes a computer program. The computer program is stored in a storage medium, and the computer program is used to implement the foregoing operation method.

All or some of the steps of the method embodiments may be implemented by hardware related to program instructions. The foregoing program may be stored in a readable memory. When the program is executed, the steps in the foregoing method embodiments are performed. The foregoing storage media include a read-only memory (ROM), a RAM, a flash memory, a hard disk, a solid-state drive, a magnetic tape, a floppy disk, an optical disc, and any combination thereof.

The embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of any other programmable data processing device to generate a machine, so that instructions executed by the computer or the processing unit of any other programmable data processing device generate an apparatus for implementing a specific function in one or more processes in the flowcharts and/or in one or more blocks in the block diagrams.

These computer program instructions may alternatively be stored in a computer-readable memory that can indicate the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded on the computer or another programmable data processing device, so that a series of operations and steps are performed on the computer or another programmable device, to generate computer-implemented processing. Therefore, the instructions executed on the computer or another programmable device provide steps for implementing a specific function in one or more processes in the flowcharts and/or in one or more blocks in the block diagrams.

It is clear that a person skilled in the art can make various modifications and variations to the embodiments without departing from their spirit and scope. Modifications and variations of the embodiments are covered provided that they fall within the scope of protection defined by the following claims and their equivalent technologies.

The term "including," and a variant thereof may refer to non-limitative inclusion; the term "or" and a variant thereof may refer to "and/or". The terms "first", "second", and the like are intended to distinguish between similar objects but do not necessarily indicate a specific order or sequence. "A plurality of" refers to two or more than two. The term "and/or" describes an association relationship between associated objects and represents that three relationships may exist. For example, A and/or B may represent the following three cases: Only A exists, both A and B exist, and only B exists. The character "/" usually represents an "or" relationship between the associated objects.

What is claimed is:

1. An operation method, applied to an operation system, wherein the operation system comprises a software processing circuit, a hardware processing circuit communicatively coupled to the software processing circuit, and a storage circuit, the software processing circuit is configured to work by executing a software program, the storage circuit stores secret information, and the method comprises:
    obtaining, from the operation system, by the software processing circuit, an operation task, wherein the operation task comprises performing one or more operations;
    generating, by the software processing circuit based on the operation task, one or more scheduling instructions corresponding to the operation task, said scheduling instructions comprising instructions for controlling the hardware processing circuit to perform an operation on an operand in a corresponding register, wherein each scheduling instruction comprises an operation type of one operation and a flag bit; and
    receiving the scheduling instructions on an instruction parsing circuit of the hardware processing circuit, and after receiving the one or more scheduling instructions, determining if the flag bit of the one or more scheduling instructions is a valid value or is an invalid value, and, based on a determination that the flag bit in the scheduling instruction is a valid value, obtaining, by the hardware processing circuit, the secret information from the storage circuit;
    determining, based on the secret information, data addresses of one or more pieces of operation data required for completing the operation corresponding to the scheduling instruction; and
    obtaining the one or more pieces of operation data based on the data addresses to complete the operation corresponding to each scheduling instruction, to complete the operation task.

2. The method according to claim 1, wherein the determining, based on the secret information, the data addresses of the one or more pieces of operation data required for completing the operation corresponding to the scheduling instruction further comprises:
    obtaining preset first relationships, wherein the preset first relationships are operation relationships between registers configured to store the one or more pieces of operation data and the secret information;
    determining the registers based on the preset first relationships and the secret information; and
    determining addresses of the registers as the data addresses.

3. The method according to claim 1, wherein the one or more pieces of operation data comprise a first source operand and a target operand, and the data addresses that are of the one or more pieces of operation data required for completing the operation corresponding to the scheduling instruction and that are determined based on the secret information comprise a data address of the first source operand and a data address of the target operand.

4. The method according to claim 2, wherein the operation task is either a point multiplication operation task or a modular exponentiation operation task, and the scheduling instruction further comprises a loop quantity i, wherein i is a quantity of times that the operation is currently performed in the operation task, i is an integer from 0 to N−1, and N is a binary length of the secret information; and correspondingly, the first relationships are relationships between identifiers of the registers and a value of an ith bit in the secret information.

5. The method according to claim 1, wherein the generating, by the software processing circuit based on the operation task, the one or more scheduling instructions corresponding to the operation task further comprises:
    when determining that a data address related to the secret information exists in data addresses of one or more pieces of operation data required for an operation, setting, by the software processing circuit, a flag bit in a scheduling instruction corresponding to the operation to the valid value; or
    when determining that no data address related to the secret information exists in the data addresses of the one or more pieces of operation data required for the operation, setting, by the software processing circuit, the flag bit in the scheduling instruction corresponding to the operation to the invalid value.

6. The method according to claim 1, wherein the operation type is either a modular multiplication operation or a modular addition operation.

7. The method according to claim 1, wherein the secret information is either a private key in an RSA algorithm or a random number in elliptic curve cryptography.

8. An operation apparatus, comprising:
a software processing circuit;
a hardware processing circuit communicatively coupled to the software processing circuit; and
a storage circuit, wherein the software processing circuit is configured to work by executing a software program, the storage circuit stores secret information, the software processing circuit is configured to:
obtain an operation task from the operation apparatus, wherein the operation task comprises performing one or more operations, and generate, based on the operation task, one or more scheduling instructions corresponding to the operation task, said scheduling instructions comprising instructions for controlling the hardware processing circuit to perform an operation on an operand in a corresponding register, wherein each scheduling instruction comprises an operation type of one operation and a flag bit; and
the hardware processing circuit is configured to:
receive the scheduling instructions on an instruction parsing circuit of the hardware processing circuit, and after receiving the one or more scheduling instructions, determine if the flag bit of the one or more scheduling instructions is a valid value or is an invalid value, and, based on a determination that the flag bit in the scheduling instruction is a valid value, obtain the secret information from the storage circuit,
determine, based on the secret information, data addresses of one or more pieces of operation data required for completing the operation corresponding to the scheduling instruction, and
obtain the one or more pieces of operation data based on the data addresses to complete the operation corresponding to each scheduling instruction, to complete the operation task.

9. The apparatus according to claim 8, wherein the hardware processing circuit is further configured to:
obtain preset first relationships, wherein the preset first relationships are operation relationships between registers configured to store the one or more pieces of operation data and the secret information;
determine the registers based on the preset first relationships and the secret information; and
determine addresses of the registers as the data addresses.

10. The apparatus according to claim 8, wherein the one or more pieces of operation data comprise a first source operand and a target operand, and the data addresses that are of the one or more pieces of operation data required for completing the operation corresponding to the scheduling instruction and that are determined based on the secret information comprise a data address of the first source operand and a data address of the target operand.

11. The apparatus according to claim 9, wherein the operation task is either a point multiplication operation task or a modular exponentiation operation task, and the scheduling instruction further comprises a loop quantity i, wherein i is a quantity of times that the operation is currently performed in the operation task, i is an integer from 0 to N−1, and N is a binary length of the secret information; and correspondingly, the first relationships are relationships between identifiers of the registers and a value of an ith bit in the secret information.

12. The apparatus according to claim 8, wherein the software processing circuit is configured to:
when determining that a data address related to the secret information exists in data addresses of one or more pieces of operation data required for an operation, set a flag bit in a scheduling instruction corresponding to the operation to the valid value; or
when determining that no data address related to the secret information exists in the data addresses of the one or more pieces of operation data required for the operation, set the flag bit in the scheduling instruction corresponding to the operation to the invalid value.

13. The apparatus according to claim 8, wherein the operation type is either a modular multiplication operation or a modular addition operation.

14. The apparatus according to claim 8, wherein the secret information is either a private key in an RSA algorithm or a random number in elliptic curve cryptography.

15. A non-transitory storage medium configured to store instructions that are executed on a processor to implement an operation method, the non-transitory storage medium comprising:
instructions for obtaining, from the processor, by a software processing circuit, an operation task, wherein the operation task comprises performing one or more operations;
instructions for generating, by the software processing circuit based on the operation task, one or more scheduling instructions corresponding to the operation task, said scheduling instructions comprising instructions for controlling a hardware processing circuit communicatively coupled to the software processing circuit to perform an operation on an operand in a corresponding register, wherein each scheduling instruction comprises an operation type of one operation and a flag bit; and
instructions for receiving, on an instruction parsing circuit of the hardware processing circuit, the scheduling instructions, and after receiving the one or more scheduling instructions, determining if the flag bit of the one or more scheduling instructions is a valid value or is an invalid value, and, based on a determination that the flag bit in the scheduling instruction is a valid value, obtaining, by the hardware processing circuit, the secret information from the storage circuit when the flag bit in the scheduling instruction is a valid value;
instructions for determining, based on the secret information, data addresses of one or more pieces of operation data required for completing the operation corresponding to the scheduling instruction; and
instructions for obtaining the one or more pieces of operation data based on the data addresses to complete the operation corresponding to each scheduling instruction, to complete the operation task.

\* \* \* \* \*